(12) United States Patent
Yamamoto et al.

(10) Patent No.: US 6,327,137 B1
(45) Date of Patent: Dec. 4, 2001

(54) ELECTRIC DOUBLE LAYER CAPACITOR APPARATUS

(75) Inventors: Koichi Yamamoto; Kenji Matsumoto; Toshiyuki Matsuoka; Kentaro Shibuya, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/657,487

(22) Filed: Sep. 8, 2000

(30) Foreign Application Priority Data

Sep. 9, 1999 (JP) .................................................. 11-256231

(51) Int. Cl.$^7$ ...................................................... H01G 2/10
(52) U.S. Cl. ..................... 361/517; 361/521; 361/502; 361/519; 361/216
(58) Field of Search ...................................... 361/517, 502, 361/817, 535, 537, 139, 216, 519, 504

(56) References Cited

U.S. PATENT DOCUMENTS

| | | | | |
|---|---|---|---|---|
| 5,420,748 | * | 5/1995 | Ryu | 361/537 |
| 5,776,637 | * | 7/1998 | Kashio et al. | 429/217 |
| 5,850,331 | * | 12/1998 | Matsumoto et al. | 361/502 |
| 6,064,563 | * | 5/2000 | Yamada et al. | 361/521 |
| 6,201,686 | * | 3/2001 | Hiratsuka et al. | 361/502 |
| 6,205,034 | * | 3/2001 | Zayatz | 361/824 |
| 6,236,557 | * | 5/2001 | Kashihara et al. | 361/301.3 |
| 6,285,541 | * | 9/2001 | Osaki et al. | 361/301.3 |

FOREIGN PATENT DOCUMENTS 2575358    4/1998  (JP) .

* cited by examiner

Primary Examiner—Anthony Dinkins
Assistant Examiner—Nguyen Ha
(74) Attorney, Agent, or Firm—Merchant & Gould P.C.

(57) ABSTRACT

An electric double layer capacitor with a control circuit component. When the electric double layer capacitor is provided in plural and these capacitors are serially connected for charging thereof through a source of DC power, the control circuit component balances charge Voltage of each electric double layer capacitor. The control circuit component is mounted to a control circuit board. The control circuit board has a diameter smaller than that of a sheath can of the electric double layer capacitor and is fixedly secured to a cover such that it does not project upwardly beyond an upper end of a pole projection, serving as a positive electrode, of the electric double layer capacitor.

9 Claims, 12 Drawing Sheets

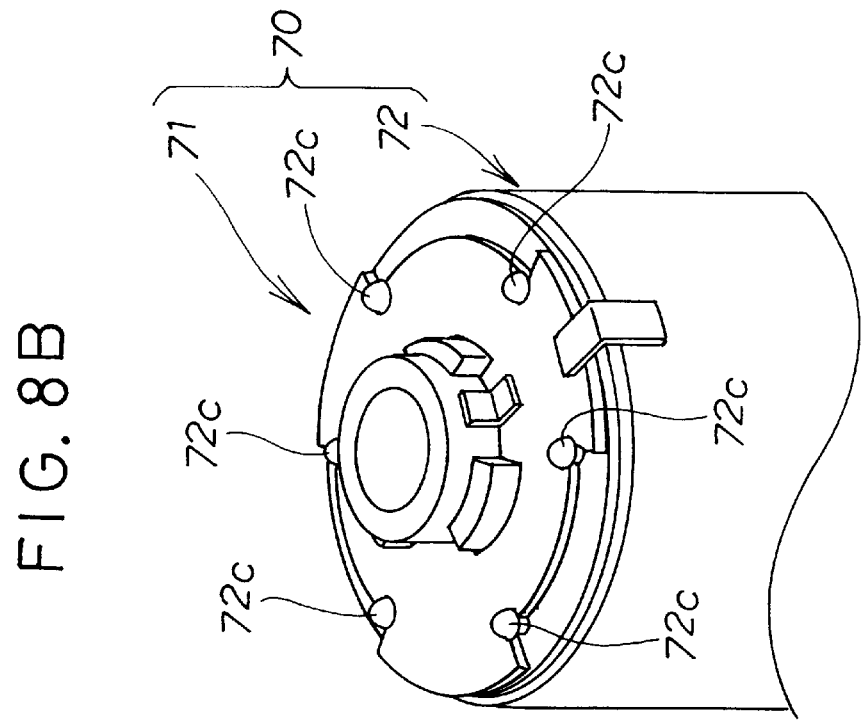
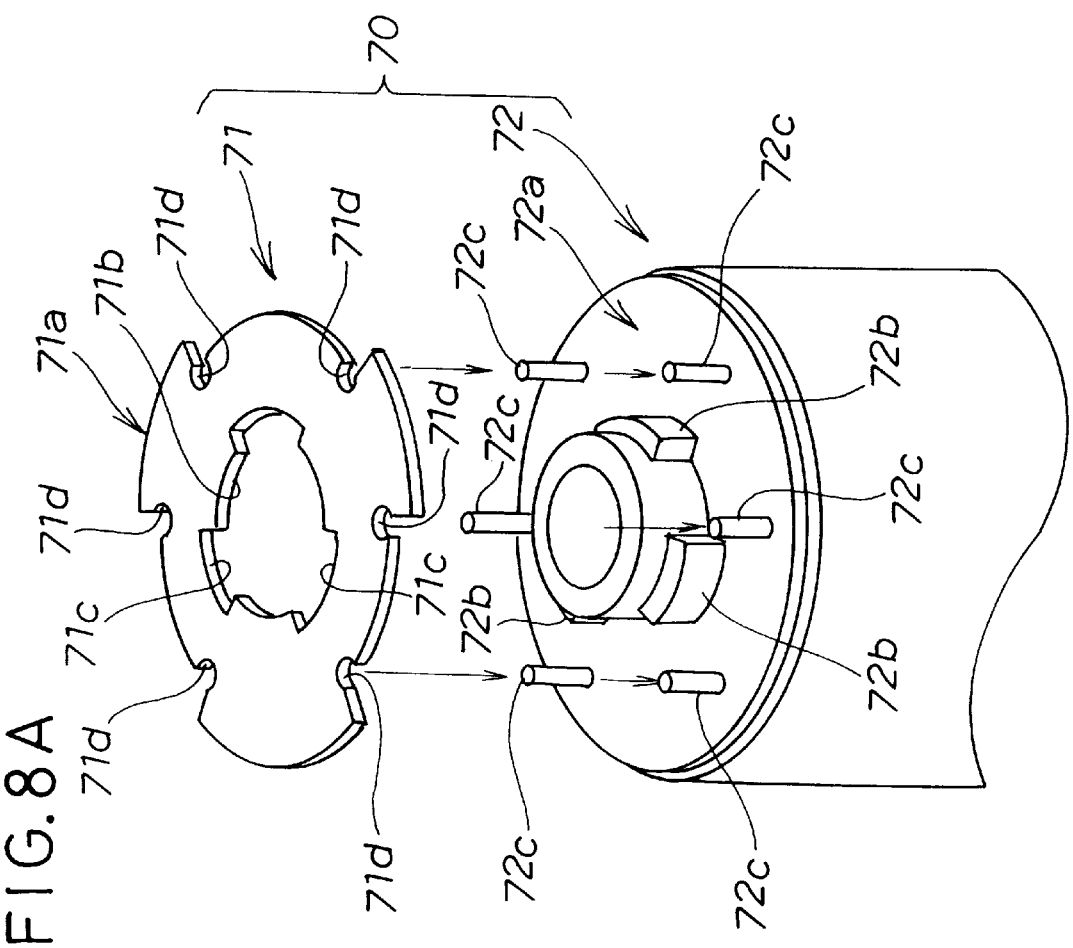

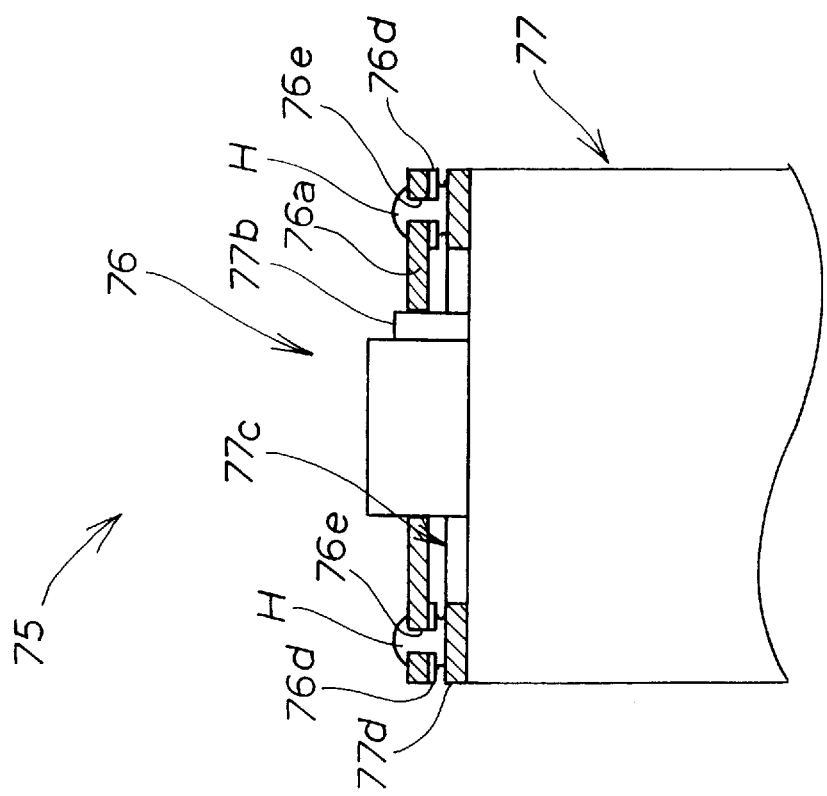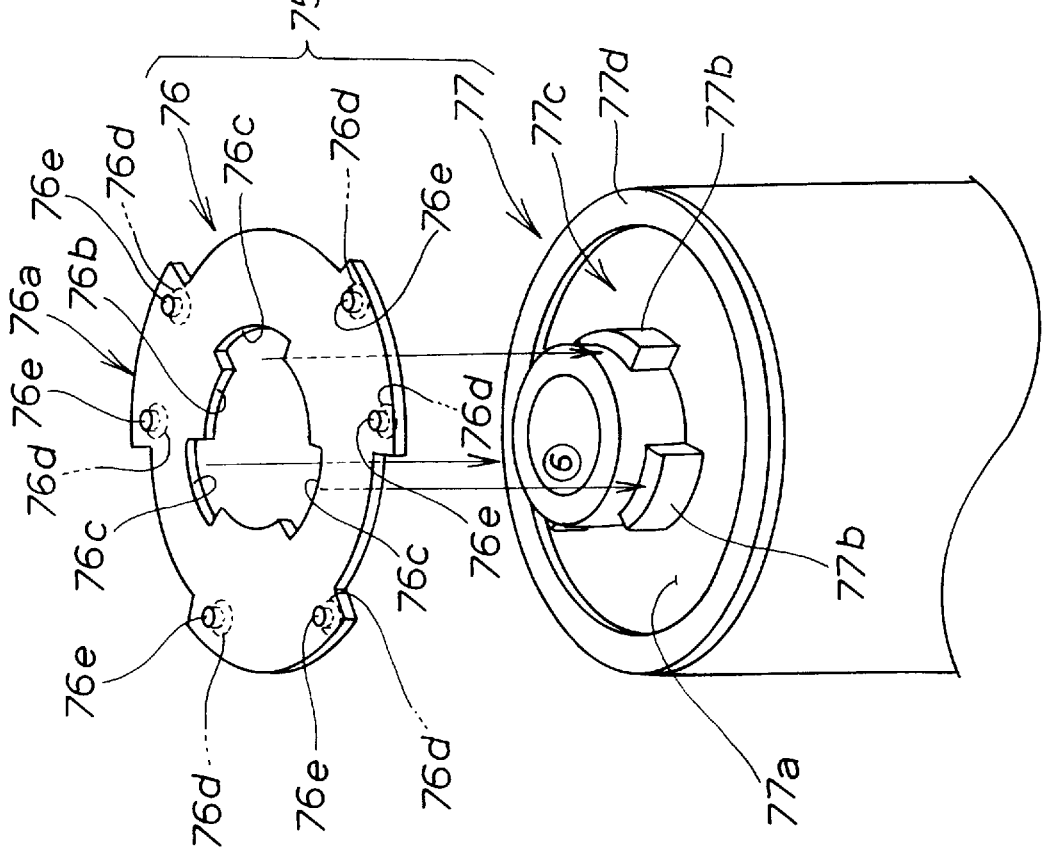

ELECTRIC DOUBLE LAYER CAPACITOR APPARATUS

BACKGROUND OF THE INVENTION

1. Field of the Invention

The present invention relates to an electric double layer capacitor apparatus that includes a control circuit for balancing charge voltage in each of a plurality of electric double layer capacitors connected in series.

2. Description of the Related Art

Various electric double layer capacitor apparatuses are known. An example of such apparatuses is disclosed in Japanese Utility Model Registration No. 2575358 entitled "Electric Double Layer Capacitor Apparatus".

The disclosed double layer capacitor apparatus includes a plurality of serially connected electric double layer capacitors. In order to balance charge voltage of each of the electric double layer capacitors, current control means comprising control transistors and a comparator is parallel-connected to each of the electric double layer capacitors. DC power supply for charging is connected between a positive terminal of a first electric double layer capacitor and a negative terminal of an end electric double layer capacitor. The interconnection between or wiring arrangement of the double layer capacitors is schematically shown in FIG. 12 hereof.

As shown in FIG. 12, the capacitor wiring arrangement 100 includes a plurality of serially connected electric double layer capacitors 101. Control circuit blocks 102 for charge voltage balancing are parallel-connected to each of the electric double layer capacitors 101. A charging DC power supply 103 is connected between a positive terminal 101a and a negative terminal 101b of the serially connected electric double layer capacitors 101. Consequently, harnesses 104 exist for connecting each of the electric double layer capacitors 101 and each of the control circuit blocks 102, thereby rendering the wiring arrangement 100 of the electric double layer capacitors complex and less reliable.

SUMMARY OF THE INVENTION

It is therefore an object of the present invention to provide an electric double layer capacitor apparatus which allows reliable electrical connection. According to an aspect of the present invention, there is provided an electric double layer capacitor apparatus comprising: an electric double layer capacitor including a metallic sheath can with a bottom, an electrode wrapper housed in the sheath can, a cover for covering an upper aperture of the sheath can and a pole projection projecting upwardly from a center portion of the cover, the pole projection serving as a positive electrode, the sheath can serving as a negative electrode: and a control circuit board having a diameter smaller than that of the sheath can and a control circuit for controlling balance of charge voltage of the electric double layer capacitor, the control circuit board being mounted to the cover such that it does not project beyond an upper end of the pole projection.

Upon electrically connecting the electric double layer capacitor and the control circuit board in a spaced fashion, for example, there arises a need to provide a lead for the connection. Provision of such a lead makes the wiring arrangement of the electric double layer capacitor apparatus complicated. Thus, in the inventive arrangement, a space between the upper end of the pole projection and the upper surface of the cover is used for mounting the control circuit board to the upper portion of the cover such that the board does not project beyond the upper end of the pole projection. As a result, the need for wiring of the lead is eliminated, thus improving the reliability of the electrical connection of the electric double layer capacitor apparatus.

Desirably, the apparatus further comprises an Insulator ring made of a resin material, for electrically isolating the pole projection from the sheath can. The insulator ring may have a plurality of locking projections projecting upwardly therefrom. The locking projections may be engaged in holes formed in the control circuit board to thereby fixedly secure the control circuit board to the electric double layer capacitor. This arrangement makes it easy to mount the control circuit board to the electric double layer capacitor.

In a preferred form, the control circuit board includes a board body which has a fitting hole formed centrally thereof, a plurality of sector-shaped cutouts provided around the fitting hole and a plurality of holes provided symmetrically about the fitting hole. The cover desirably includes an insulator ring forming part thereof and having sector-shaped projections being complementary in shape to the sector-shaped cutouts for fitting into the sector-shaped cutouts, and fitting projections projecting upwardly through the holes.

In an alternative form, the control circuit board includes a board body having a fitting hole formed centrally thereof and a plurality of sector-shaped cutouts provided around the fitting hole. The cover includes an insulator ring forming part thereof and having sector-shaped projections being complementary in shape to the sector-shaped cutouts for fitting into the sector-shaped cutouts. Each of the sector-shaped projections has board-fitting cutouts. The control circuit board is fixedly secured to the electric double layer capacitor, after fitting the sector-shaped projections into the sector-shaped cutouts, by rotating the control circuit board to cause the board body to be fitted into the board-fitting cutouts.

In a further alternative form, the control circuit board includes a board body having a fitting hole formed centrally thereof, a plurality of sector-shaped cutouts provided around the fitting hole, a plurality of copper foil lands provided in a back surface of the board body, and a plurality of through-holes extending through the board body and copper foil lands. The cover includes an insulator ring forming part thereof and having sector-shaped projections being complementary in shape to the sector-shaped cutouts for fitting into the sector-shaped cutouts The control circuit board is fixedly secured to the electric double layer capacitor by solder bonding, through the through-holes, copper foil lands to an outer ring made of metal forming part of the cover.

In a still further alternative form, the control circuit board includes a board body having a fitting hole formed centrally thereof. The pole projection has a male thread formed on an outer surface thereof. The control circuit board is fixedly secured to the electric double layer capacitor by screwing, through the fitting hole, the control circuit board into the pole projection.

The apparatus may further comprise: a ring-shaped pole projection contact terminal provided on the control circuit board for electrically connecting the control circuit board and the pole projection of the electric double layer capacitor; and a ring-shaped can body contact terminal provided between the control circuit board and the metallic outer ring forming part of the cover and electrically connecting the sheath can of the electric double layer capacitor and the control circuit board.

BRIEF DESCRIPTION OF THE DRAWINGS

Certain preferred embodiments of the present invention will hereinafter be described in detail, by way of example only, with reference to the accompanying drawings, in which:

FIGS. 8A and 8B show a state of attachment of a control circuit board to an electric double layer capacitor in an electric double layer capacitor apparatus according to a fourth embodiment of the present invention;

FIGS. 9A and 9B show a state of attachment of a control circuit board to an electric double layer capacitor in an electric double layer capacitor apparatus according to a fifth embodiment of the present invention;

DETAILED DESCRIPTION OF THE PREFERRED EMBODIMENTS

The following description is merely exemplary in nature and is in no way intended to limit the invention, its application or uses.

Figure 1:
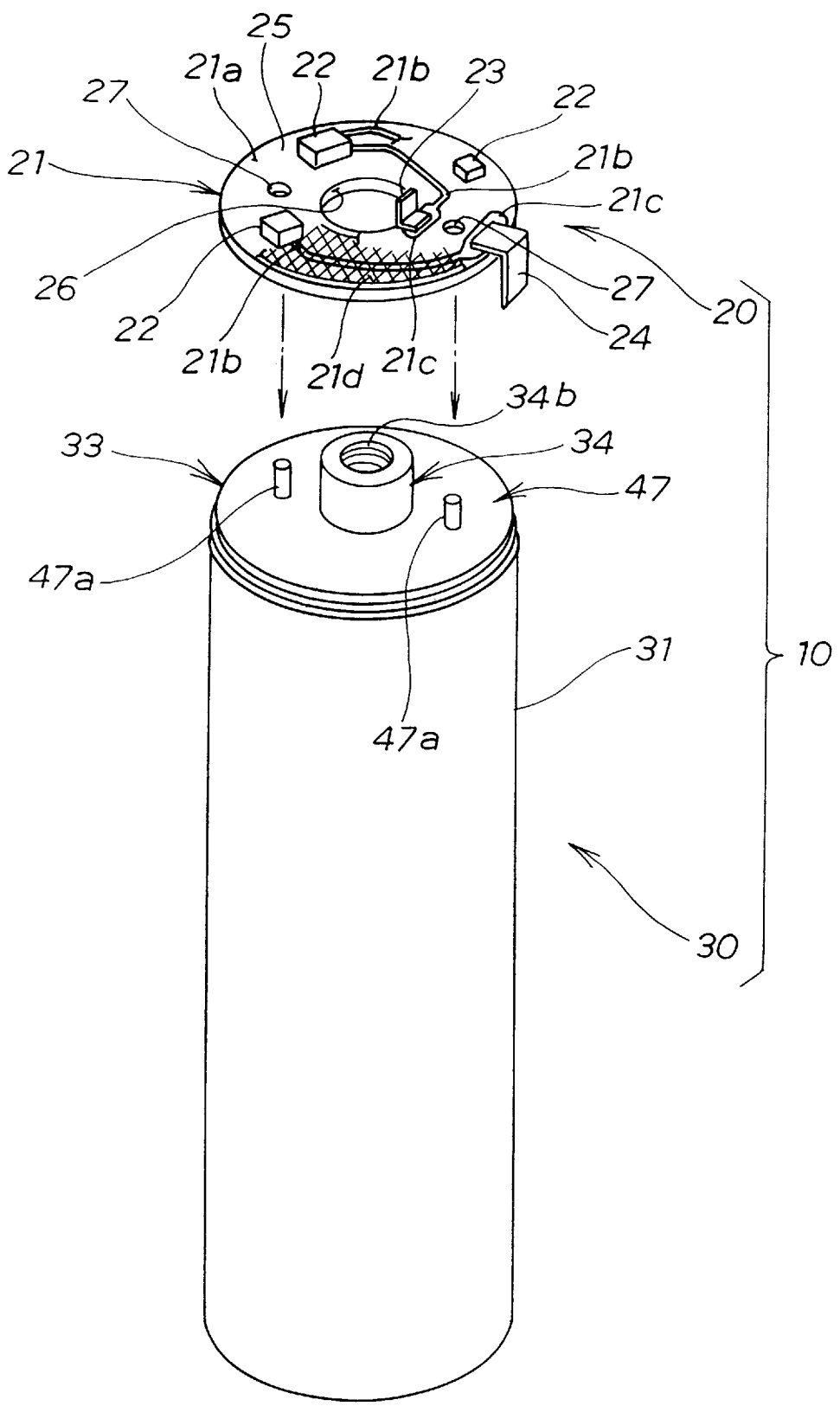
FIG. 1 is an exploded perspective view illustrating an electric double layer capacitor apparatus according to a first embodiment of the present invention.

Referring to FIG. 1, an electric double layer capacitor apparatus 10 includes an electric double layer capacitor 30, and a control circuit board 20 having a control circuit for balancing charge voltage of an electric double layer capacitor 30.

Control circuit board 20 includes a board body 21, and a plurality of circuit components 22 such as an integrated circuit (IC) arranged on the board body 21 (three circuit components are illustrated in the embodiment being described). Designated by reference numeral 23 is a pole projecting contact terminal electrically connected to a positive pole of the electric double layer capacitor 30. A contact terminal for can body 23 is electrically connected to a negative pole of the electric double layer capacitor 30.

In the board body 21, a copper foil surface 25 is formed in an upper surface of the base 21a. An unwanted portion of this copper foil surface 25 is etched to form circuit patterns 21b and soldering lands 21c. Except these lands 21c, a resist 21d for preventing corrosion of circuit patterns 21b is formed over the upper surface of the base 21a. An aperture 26 is formed in center portion of the base 21a. In order to mount the circuit board 20 to the electric double layer capacitor 30 preventing rotation, two holes 27, 27 are formed in symmetrical locations around the aperture 26.

Figure 2:
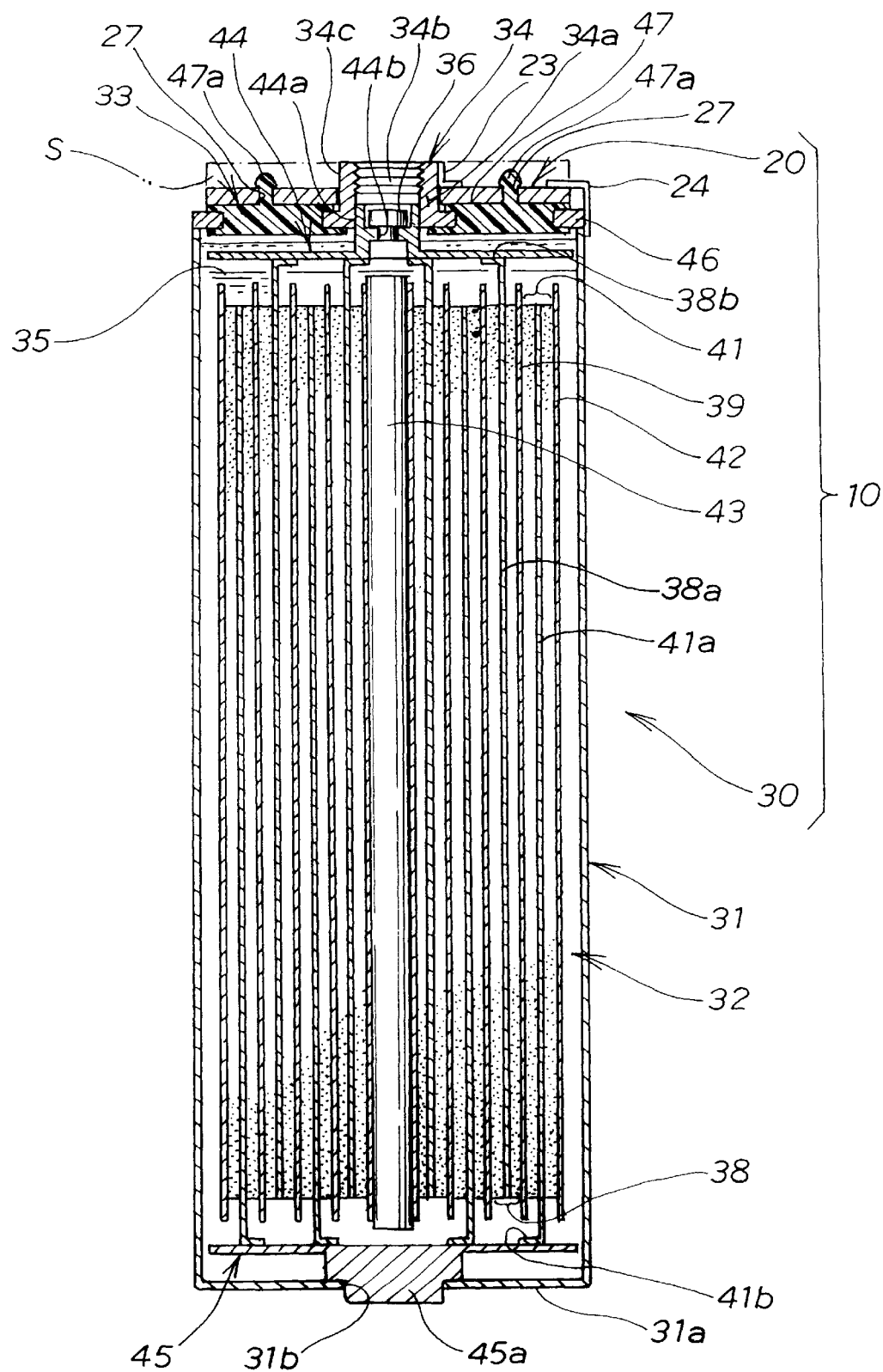
FIG. 2 is a cross-sectional view illustrating the electric double layer capacitor apparatus shown in FIG. 1.

Referring to FIG. 2, the electric double layer capacitor 30 includes a cylindrical sheath can or casing 31 made from a conductor material and having a bottom, an electrode wrapper or rolled electrode member 32 housed in the sheath can 31, a cover 33 for shutting the upper aperture of the sheath can 31, a pole projection 34 projecting upwardly from the cover 33, electrolytic solution 35 filled in the sheath can 31, and a cap 36 for capping the can filled with the electrolytic solution 35. Pole projection 34 becomes a positive pole while the sheath can 31 becomes a negative pole.

The sheath can 31 has a through hole 31b formed in a center portion of a bottom 31a thereof for allowing insertion of a component of the electrode wrapper 32.

The electrode wrapper 32 is arranged such that a positive electrode plate 38, a negative electrode plate 41 and a separator 39, comprising an insulator film placed between the positive electrode plate 38 and the negative electrode plate 41, are put together into a roll shape wound around a core 43. Upper end portion 38b of the positive electrode foil 38a is bent to the positive electrode plate 44 and is held in contact with a negative collecting plate 45 such that a negative electrode foil 41a is electrically contacted to the negative collecting plate 45.

The positive electrode plate 44 includes a cylindrical portion 44a formed in its center portion to project upwardly. Cap fastening portion 44b for fastening the cap 36 is formed in an inner surface of the cylindrical portion 44a.

Negative collecting plate 45 includes a projecting portion 45a formed in its center portion to project downwardly. The projecting portion 45a is arranged in the aperture 31b formed in the bottom 31a of the sheath can 31.

Cover 33 is arranged such that an insulator ring 47 made of resin material couples an outer ring 46 made of outer conductive material, and a conductive pole projection 34. An outer ring 46 is welded to the upper apertured portion of the sheath can 31 to shield the sheath can 31.

The insulator ring 47 includes locking projections 47a, 47a projecting upwardly so that they can lockingly engage in the holes 27, 27 formed in the control circuit board 20. By thus engaging the locking projections 47a, 47a in the respective holes 27, 27 of the control circuit board 20, the control circuit board 20 is fixedly secured to the electric double layer capacitor 30.

Pole projection 34 comprises a cylindrical portion 34a in the form of a cylinder. Internal thread 34b is formed in the inner surface of the cylindrical portion 34a. Element 34c represents an outer surface of the pole projection 34.

Space S spans from an upper end of the pole projection 34 to an upper surface of the cover 33 and is provided to allow positioning and fitting of the control circuit board 20 onto the cover 33.

Now, the fitting sequence of the control circuit board 20 to the electric double layer capacitor 30 will be described with reference to FIGS. 3A to 3C.

Figure 3:
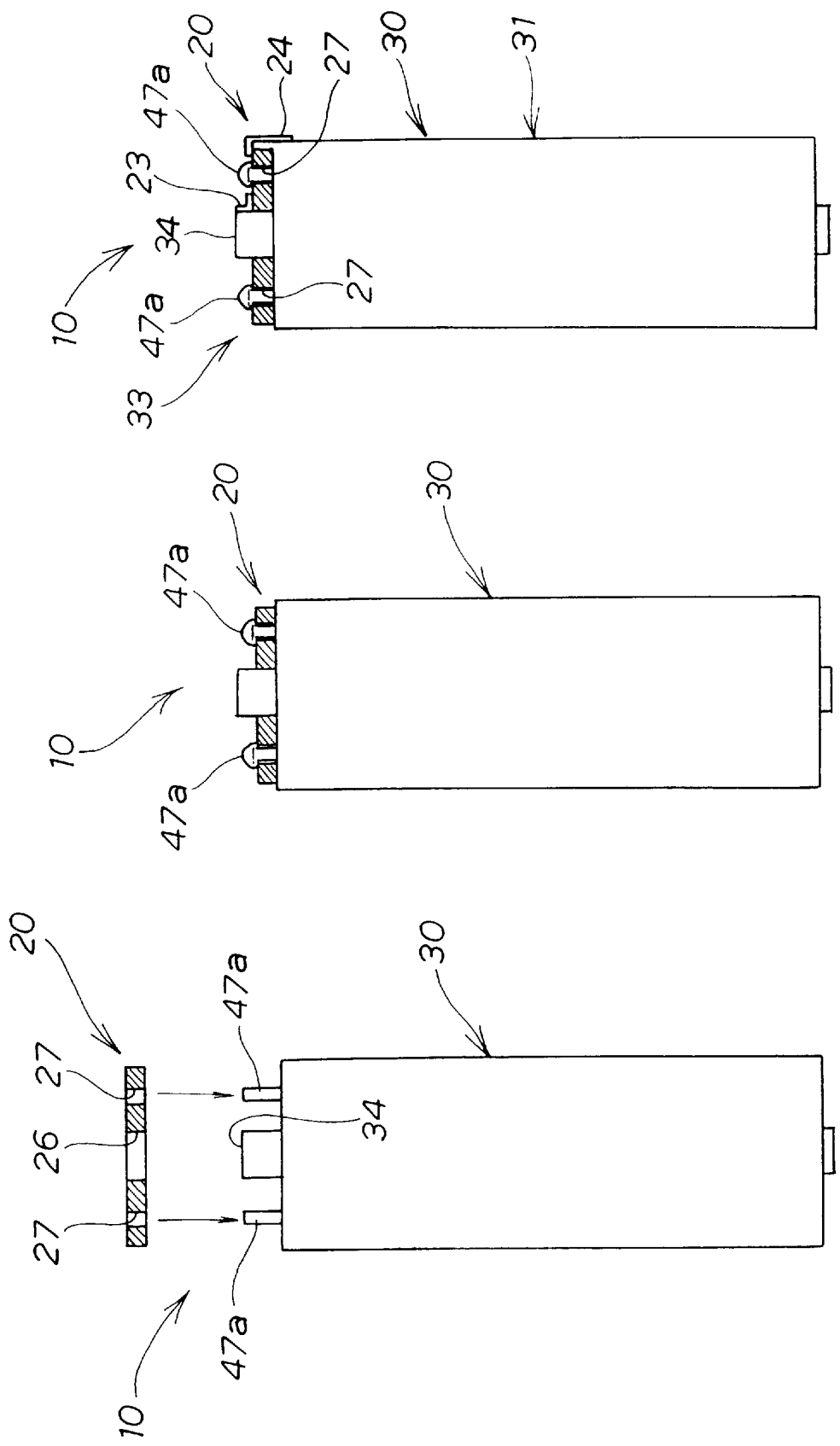
FIGS. 3A to 3C illustrate procedures for attaching a control circuit board to an electric double layer capacitor in the electric double layer capacitor apparatus according to the first embodiment.

Referring to FIG. 3A, the position of the holes 27, 27 formed in the control circuit board 20 is aligned with the positions of the locking projections 47a, 47a formed in the electric double layer capacitor 30 side, and the locking projections 47a, 47a is fitted to the holes.

Referring to FIG. 3B, the end of the locking projections 47a, 47a is heated to form an expanding portion such that the control circuit board 20 is fixed to the electric double layer capacitor 30 preventing control circuit board 20 from moving apart from the locking projections 47a, 47a.

As shown in FIG. 3C, the control circuit and the pole projection 34 are electrically connected via the pole projection contact terminal 23 while the control circuit board 20 and the sheath can 31 are electrically connected via the can body contact terminal 24.

With the locking projections 47a, 47a thus engaged in the holes 27, 27 formed in the control circuit board 20, it becomes possible to easily mount the control circuit board 20 to the electric double layer capacitor 30 and to eliminate a need to provide a lead for coupling the electric double layer capacitor 30 and a plurality of circuit components 22.

Figure 4:
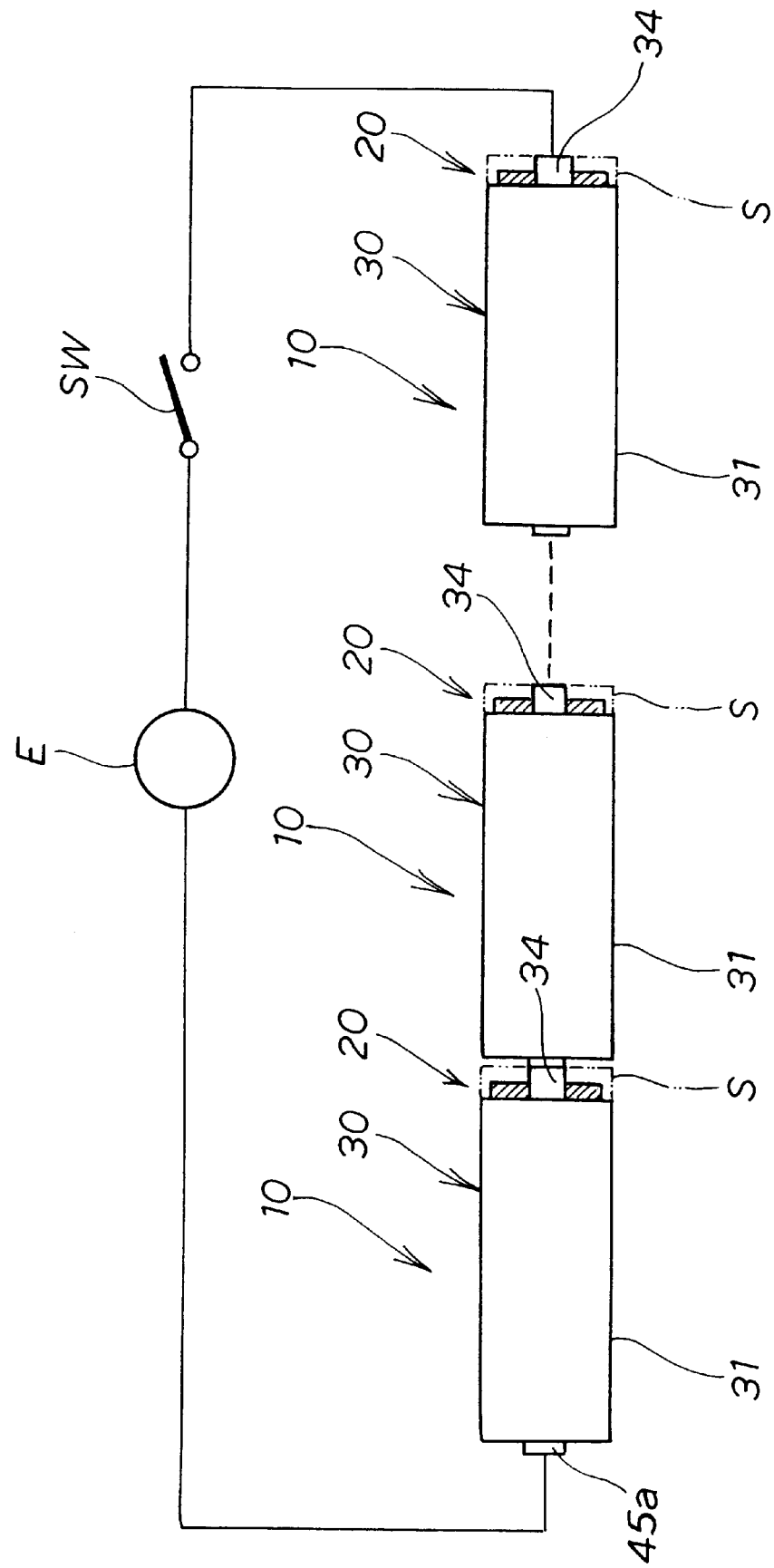
FIG. 4 shows an exemplary arrangement for serially connecting plural electric double layer capacitor apparatuses as shown in FIG. 2.

Reference is now made to FIG. 4 illustrating a first embodiment wherein plural electric double layer capacitors 30 are serially connected.

As shown in FIG. 4, each electric double layer capacitor 30 includes the control circuit board 20. DC power supply E is connected between the pole projection 34 of the electric double layer capacitor 30 located at an end of the serial connection and the projecting portion 45a projecting from the bottom of the sheath can 31 of the electric double layer capacitor 30 located at the other end of the serial connection. The DC power supply E charges each of the electric double layer capacitors 30.

As shown in FIG. 2, in the electric double layer capacitor apparatus 10 of the first embodiment, nothing projects upwardly from an area between the upper end of the pole projection 34 and the surface of the cover 33, that is, beyond the top end of the pole projection 34. Also, the control circuit board 20 having a diameter smaller that of the sheath can 31 is fitted into an upper portion of the cover 33. Thus, the coupling of each of the electric double layer capacitors 30 is made easier. Consequently, a lead for the connection between the electric double layer capacitor 30 and the control circuit board 20 is no longer necessary, thereby eliminating the need to run the lead. As a result, the reliability of the electrical connectivity of the electric double layer capacitor 30 and the control circuit board 20 is improved.

Figure 5:
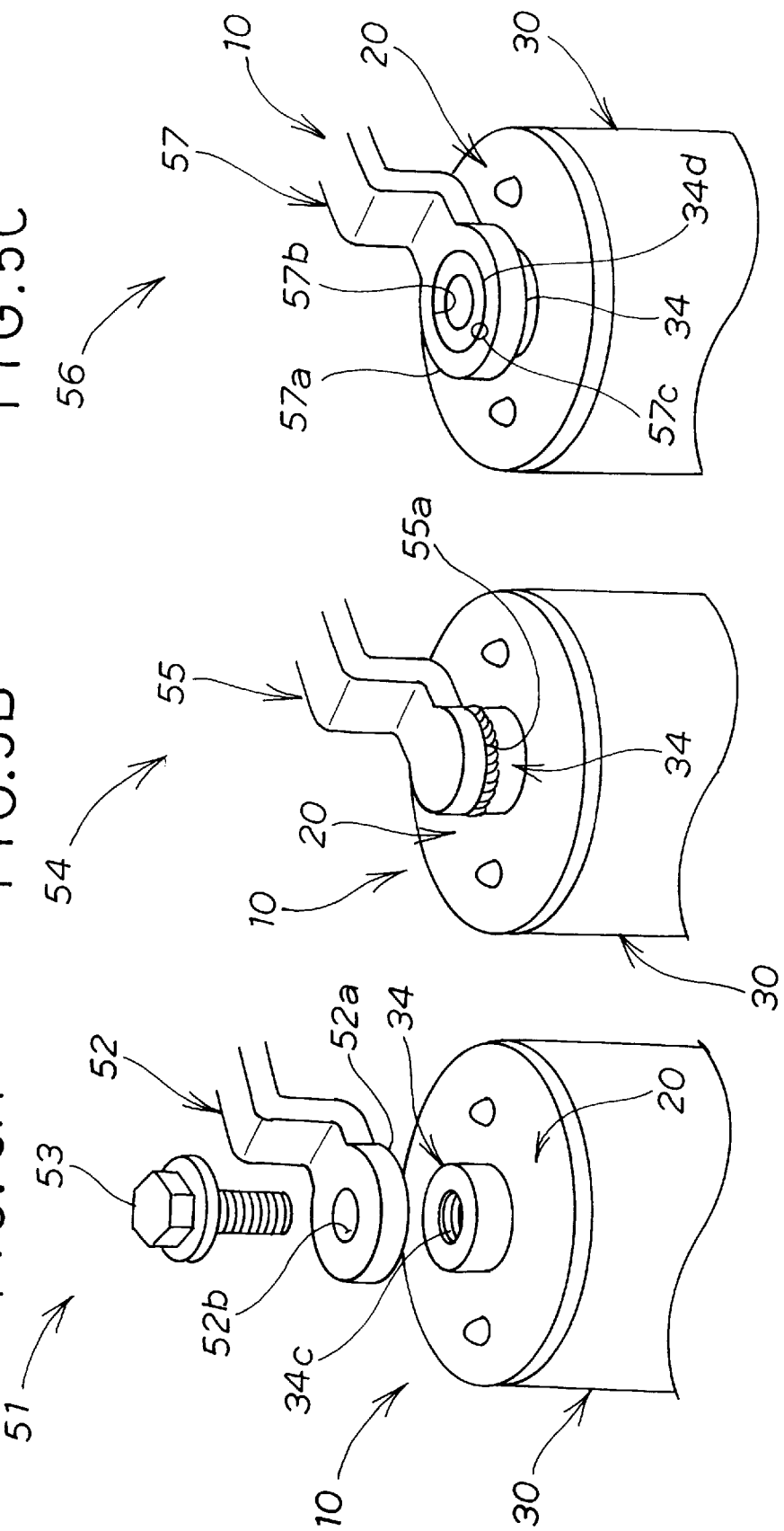
FIGS. 5A to 5C show three different modes of attachment of a terminal to the electric double layer capacitor apparatus according to the first embodiment.

FIGS. 5A to 5C show exemplary modes of attachment of a terminal to the electric double layer capacitor apparatus according to the first embodiment.

Shown in FIG. 5A is a first example mode of attachment. The terminal mounting arrangement 51 according to the first example includes a terminal 52 which has a hole 52b in contacting portion 52a where the pole projection 34 of the electric double layer capacitor 30 is contacted, and a bolt 53 which mounts the terminal 52 to the electric double layer capacitor 30. The contacting portion 52a is put to the end of the pole projection 34 and the bolt 53 is screwed down at internal thread 34c of the pole projection 34 such that the terminal 52 is mount to the electric double layer capacitor 30.

In FIG. 5B, a second mode of attachment is shown. Terminal mounting arrangement 54 of the second example comprises a terminal 55 that includes contact portion 55a that contacts a pole projection 34 of the electric double layer capacitor 30. The contact portion 55a is attached to an end of the pole projection 34. The end of the pole projection 34 and the contact portion 55a are weld-connected together.

A third mode of attachment is shown in FIG. 5C. Terminal mounting arrangement 56 of the third mounting example includes a terminal 57 which has a fitting hole 57b in a contact portion 57a where the pole projection 34 of the electric double layer capacitor 30 is contacted. Peripheral portion 34d of the pole projection 34 is fit to a fitting hole 57b and an interface 57c of the peripheral portion 34d and the fitting hole 57b are weld together. Thus, the interface 57c of the pole projection 34 and a fitting hole 57b are weld-connected together such that the heat caused by the welding is cut off at the contact portion 57a and the heat transfer to the control circuit board 20 caused by the welding is prevented.

Figure 6:
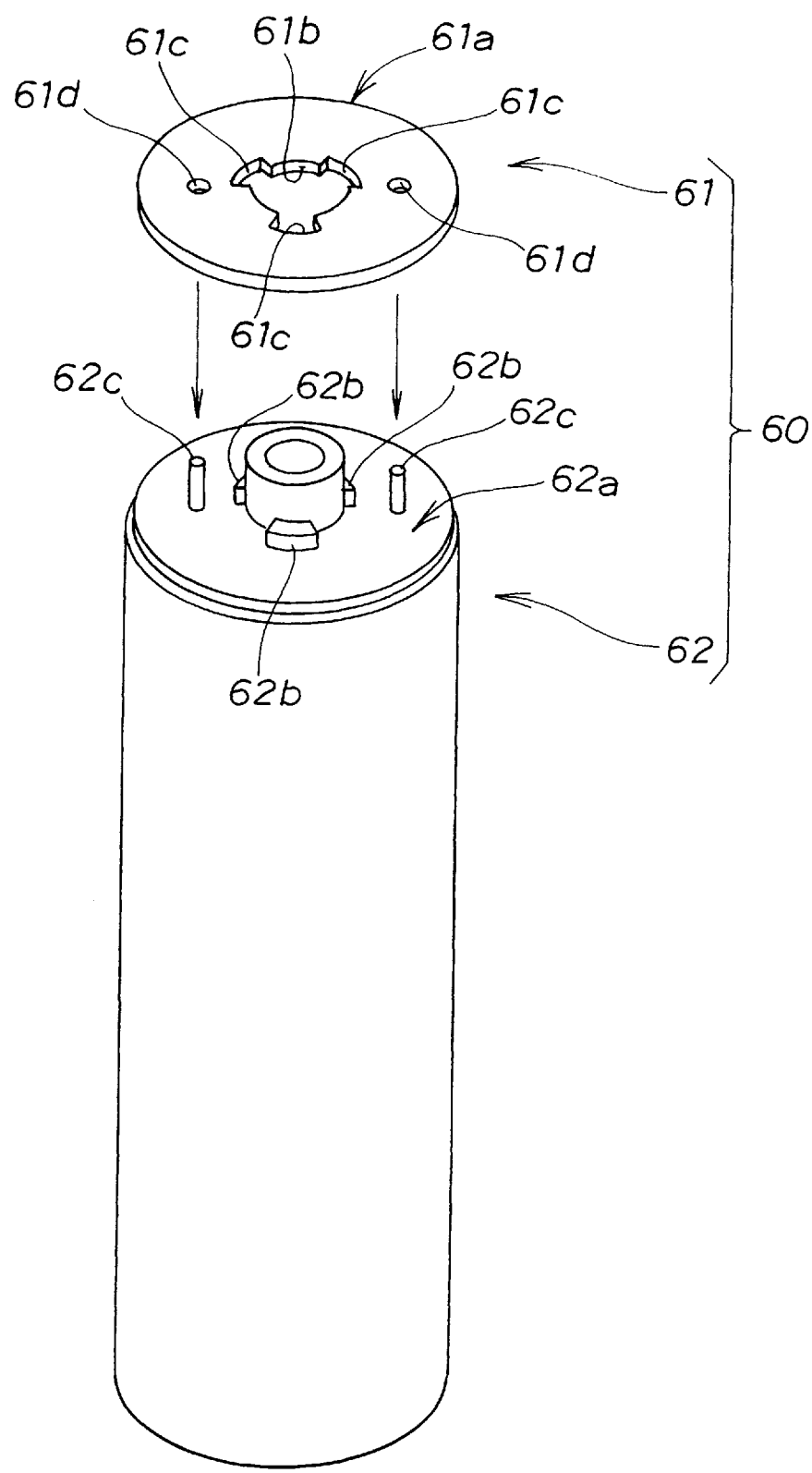
FIG. 6 is an exploded perspective view illustrating an electric double layer capacitor apparatus according to a second embodiment of the present invention.

FIG. 6 shows an electric double layer capacitor apparatus according to a second embodiment of the invention. An electric double layer capacitor apparatus 60 of this embodiment comprises a control circuit board 61 and a electric double layer capacitor 62 including the control circuit board 61.

Fitting hole 61b is formed in a center portion of a board body 61a of the control circuit board 61. A plurality of sector-shaped cutouts 61c is formed in the peripheral portions of this fitting hole 61b in equal interval. In the board body 61a, two holes 61d, 61d are formed in symmetrical locations around the control circuit board 61. In an insulator ring 62a of the electric double layer capacitor 62, in order to fix the position of the control circuit board 61, a plurality of sector-shaped projections 62b is formed for fitting into the sector-shaped cutouts 61c. In the insulator ring 62a, locking projections 62c which correspond to the two holes 61d, 61d formed in the control circuit board 61 are formed. Upon fitting these locking projections 62c into the holes 61d as shown by arrows, sector-shaped projections 62b are fitted into the sector-shaped cuttings 61c such that rotation of the control circuit board 61 relative to the electric double layer capacitor 62 is prevented.

Figure 7:
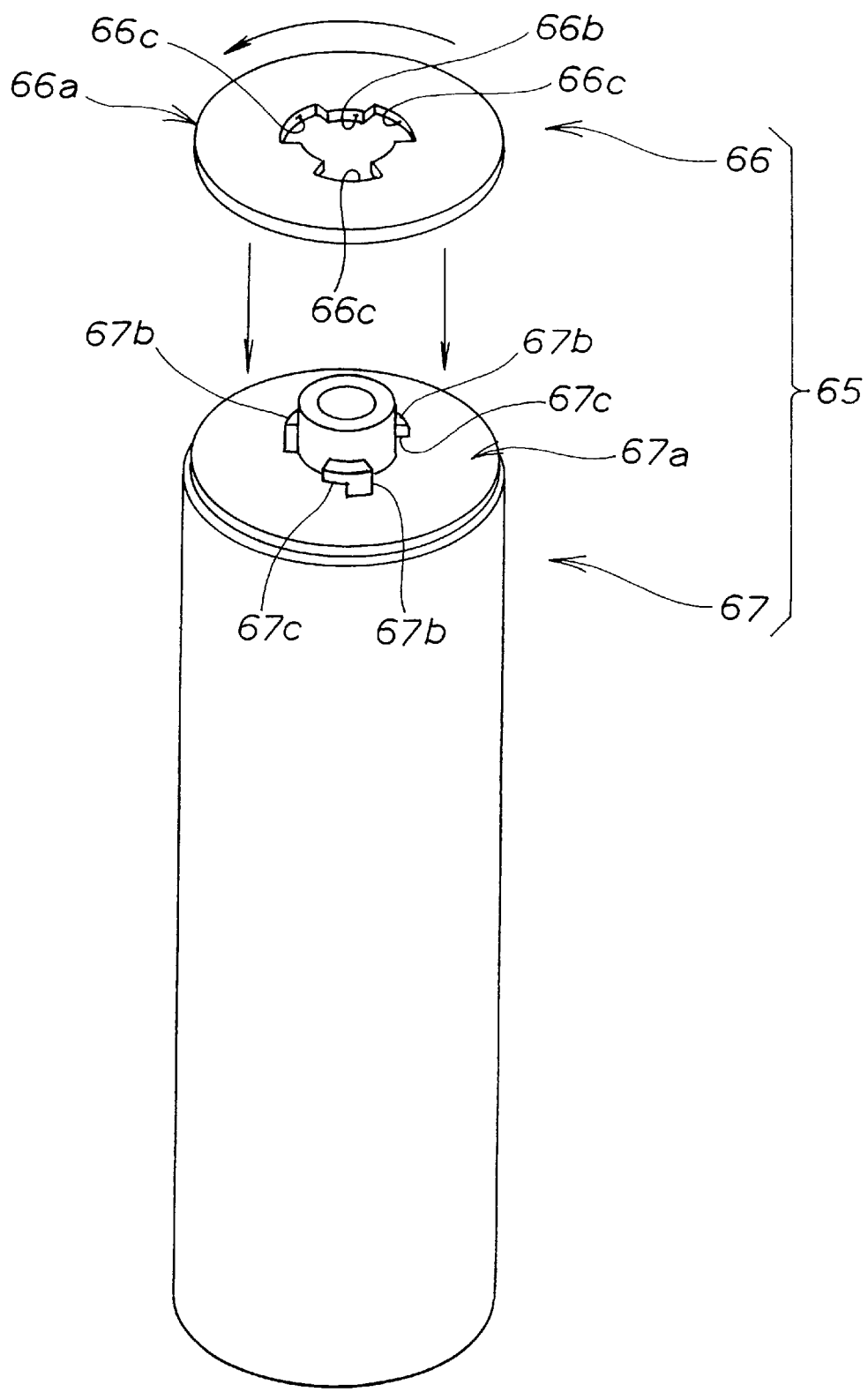
FIG. 7 is an exploded perspective view illustrating an electric double layer capacitor apparatus according to a third embodiment of the present invention.

FIG. 7 shows an electric double layer capacitor apparatus according to a third embodiment of the invention. An electric double layer capacitor apparatus 65 of this embodiment comprises a control circuit board 66 and an electric double layer capacitor 67 to which the control circuit board 66 is to be mounted.

Fitting hole 66b is formed centrally of the board body 66a of the control circuit board 66. In a periphery of the fitting hole 66b, a plurality of sector-shaped cutouts 66c (three in the illustrated embodiment) is formed at equal intervals. In the insulator ring 67a of the electric double layer capacitor 67, a plurality of sector-shaped projections 67b is formed for fitting into the sector-shaped cutouts 66c. Board-fitting cutouts 67c are formed in these sector-shaped projections 67b. Sector-shaped projections 67b are fitted into the sector-shaped cutouts 66c as shown by arrows. Then, the control circuit board 66 is rotated in a counterclockwise direction, and the board body 66a is fitted into the board-fitting cutouts 67c such that the control circuit board 66 is fixed to the electric double layer capacitor 67.

FIG. 8A and 8B show an electric double layer capacitor apparatus according to a fourth embodiment of the present invention. The electric double layer capacitor apparatus 70 of this embodiment comprises a control circuit board 71 and an electric double layer capacitor 72 to which the control circuit board 71 is to be mounted.

Referring to FIG. 8A, a fitting hole 71b is formed in a center portion of the board body 71a of the control circuit board 71. In a periphery of this fitting hole 71b, a plurality of sector-shaped cutouts 71c (three in the illustrated embodiment) is formed at equal intervals. In a periphery of the board body 71a, a plurality of cutouts 71d (six in the illustrated embodiment) formed by cutting out part of a round hole is formed at equal intervals. In the insulator ring 72a of the electric double layer capacitor 72, a plurality of sector-shaped projections 72b is formed for fitting into the sector-shaped cutouts 71c. In the insulator ring 72a, locking projections 72c corresponding to the six cutouts 71d formed in the control circuit board 71 are formed. These locking projections 72c are fitted into the cutouts 71d as shown by arrows.

Ends of the locking projections 72c are heated to provide expanded or bulged portions for securing the control circuit board 71 to the electric double layer capacitor 72, as shown in FIG. 8B.

FIG. 9A and 9B illustrate an electric double layer capacitor apparatus according to a fifth embodiment of the present invention. An electric double layer capacitor apparatus 75 of this embodiment comprises a control circuit board 76 and an electric double layer capacitor 77 to which the control circuit board 76 is to be attached.

As shown in FIG. 9A, a fitting hole 76b is formed in a center portion of the board body 76a of the control circuit board 76. In a peripheral part of this fitting hole 76b, a plurality of sector-shaped cutouts 76c (three in this case) is formed at equal intervals. Board body 76a includes a plurality of copper foil lands 76d (six in the illustrated embodiment) in its back. In these copper foil lands 76d and the board body 76a, through-holes 76e are formed to pass therethrough. In the insulator ring 77a of the electric double layer capacitor 77, three sector-shaped projections 77b are formed for fitting into the sector-shaped cuttings 76c. Sector-shaped projections 77b are fitted into the sector-shaped cuttings 76c as shown by arrows.

Upon solder bonding the copper foil lands 76d to the sector-shaped projections 77d of the cover 77c as shown in FIG. 9B, solder may flow into the through-holes 76e so that the control circuit board 76 can be fixed to the electric double layer capacitor 77. Reference character SHY represents the solder bonded portion. With this solder bonding, the control circuit board 76 is not only fixed to the electric double layer capacitor 77 but also is electrically connected to the electric double layer capacitor 77.

Figure 10:
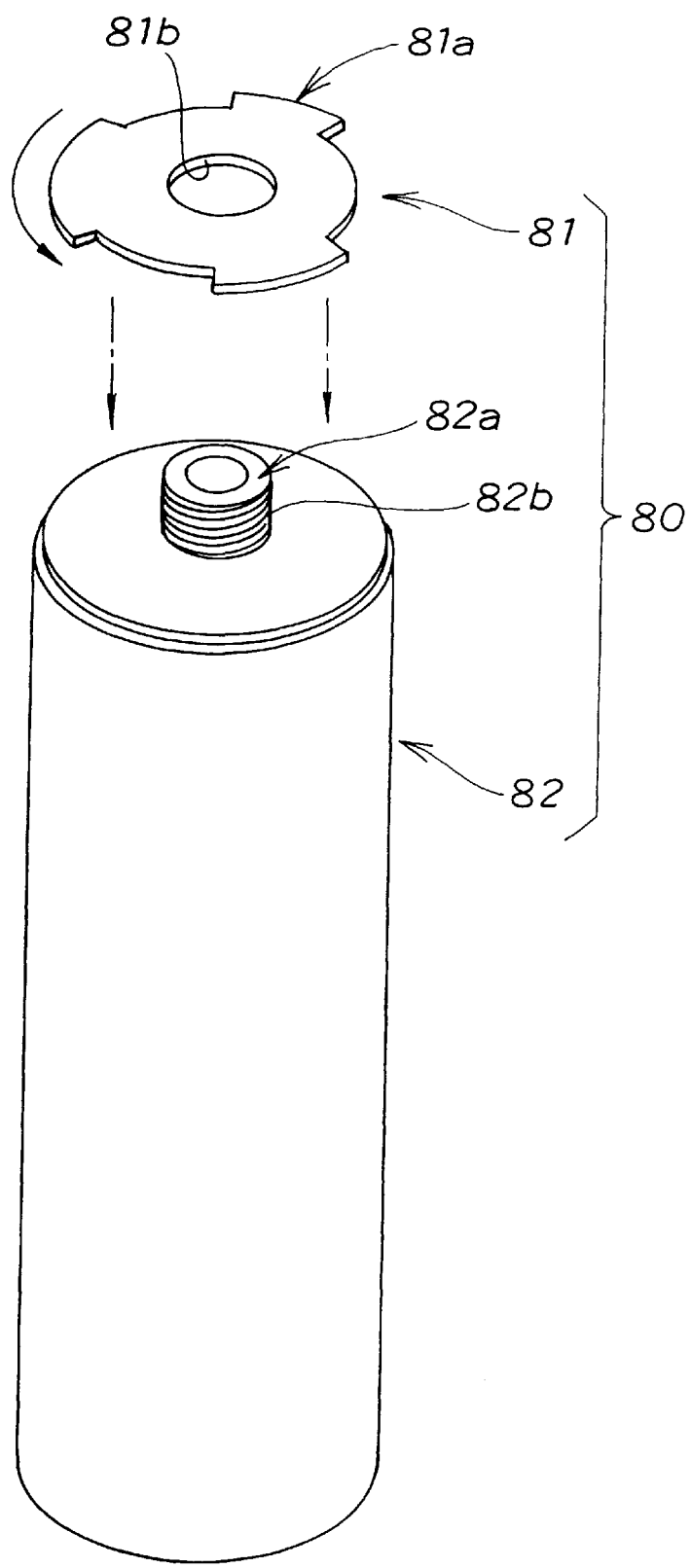
FIG. 10 is an exploded perspective view illustrating an electric double layer capacitor apparatus according to a sixth embodiment of the present invention.

Reference is now made to FIG. 10 showing an electric double layer capacitor apparatus according to a sixth embodiment of the present invention. An electric double layer capacitor apparatus 80 comprises a control circuit board 81 and an electric double layer capacitor 82 to which the control circuit board 81 is to be mounted.

A fitting hole 81b is formed in a center portion of the board body 81a of the control circuit board 81. External threads 82b, 82b are formed in a periphery of the pole projection 82a of the electric double layer capacitor 82. The control circuit board 81 is threadedly engaged, via the fitting hole 81b, with a male thread 82b, as shown by arrows, so that the control circuit board 81 can be fixed to the electric double layer capacitor 82. By thus threadedly engaging the control circuit board 81 with the pole projection 82a having the male thread 82b, the control circuit board 81 and the electric double layer capacitor 82 can be electrically connected.

Figure 11B:
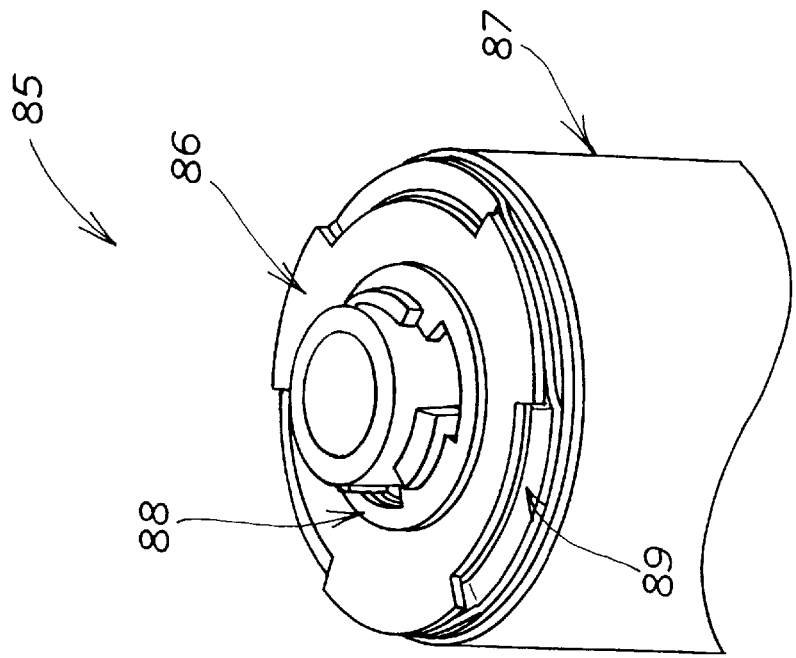
FIGS. 11A and 11B show a state of attachment of a control circuit board to an electric double layer capacitor in an electric double layer capacitor apparatus according to a seventh embodiment of the present invention.
Figure 11A:
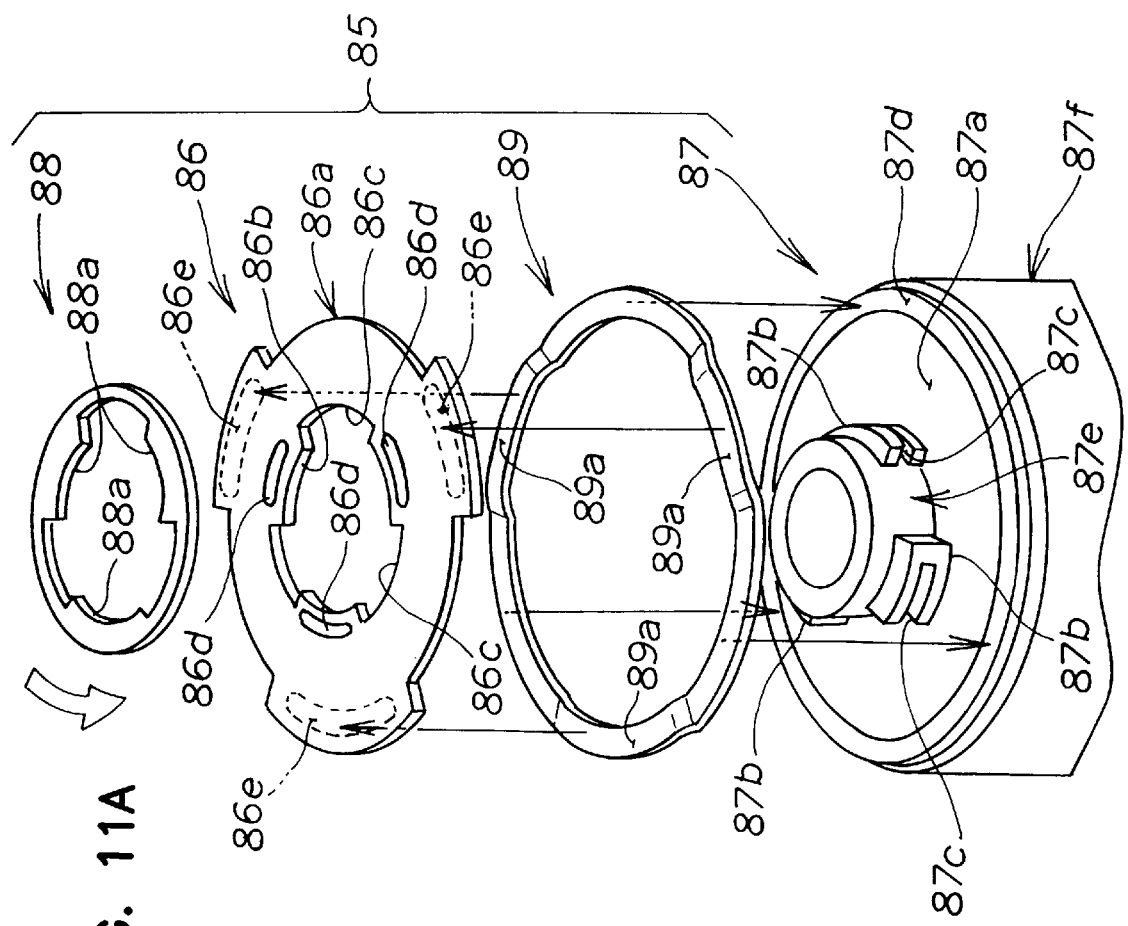
Figure 12:
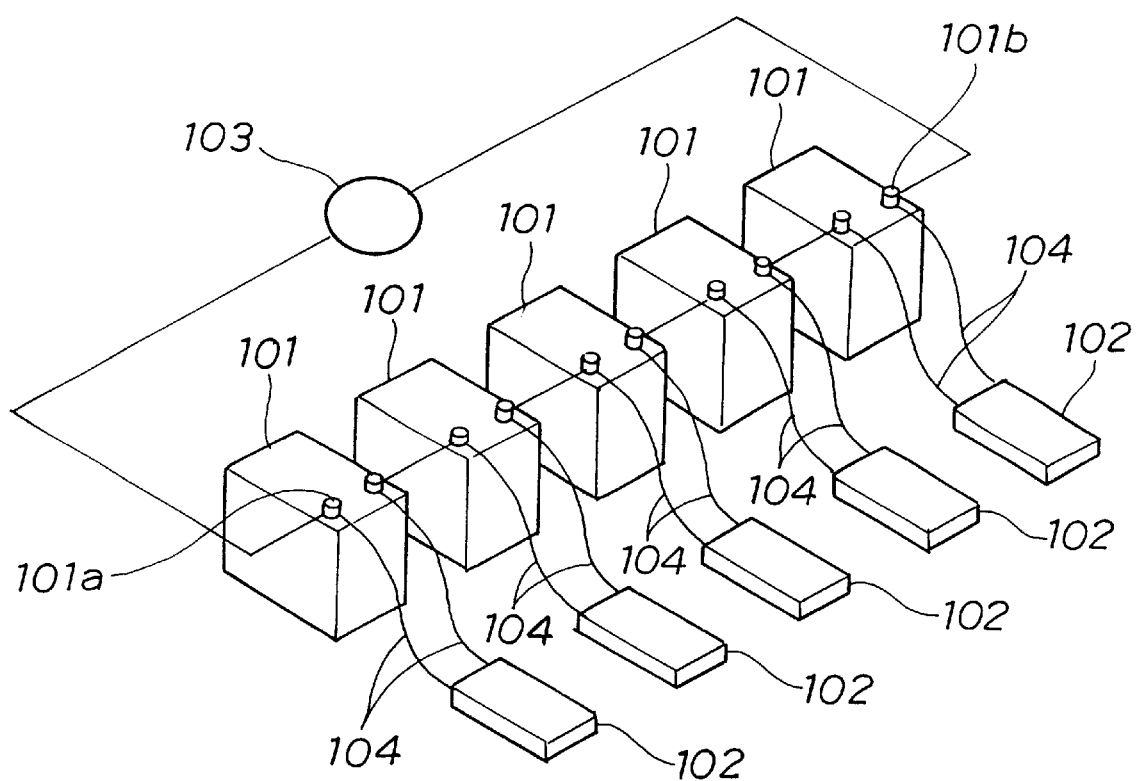
FIG. 12 is a schematic perspective view illustrating a conventional electric double layer capacitor apparatus employing a control circuit board.

FIGS. 11A and 11B show an electric double layer capacitor apparatus according to a seventh embodiment of the present invention. An electric double layer capacitor apparatus 85 of this embodiment comprises a control circuit board 86, an electric double layer capacitor 87 to which the control circuit board 86 is to be mounted, a ring-shaped pole projection contact terminal 88 for electrically connecting the control circuit board 86 to the electric double layer capacitor 87, and a ring-shaped contact terminal 89 for electrically connecting the control circuit board 86 to the can body of the electric double layer capacitor 87.

As shown in FIG. 11A, a fitting hole 86b is formed in a center portion of the board body 86a of the control circuit board 86. Around the fitting hole 86b, a plurality of sector-shaped cutouts 86c (three in this case) is formed at equal intervals. In the surface of the board body 86a, a plurality of contacting copper foil lands 86d (three in this case) is formed at equal intervals. In a back surface of the board body 86a, a plurality of contacting copper foil lands 86e (three in the illustrated embodiment) is formed such that they are located outside (in a radical direction of) the contacting copper foil lands 86d. In the insulator ring 87a of the electric double layer capacitor 87, sector-shaped projections 87b, which fit into the sector-shaped cutouts 86c of the control circuit board 86, are formed. In each of the sector-shaped projections 87b, sector-shaped fitting cutouts 87c are formed. The ring-shaped pole projection contact terminal 88 is electrically conductive and includes a plurality of projections 88a (three in the illustrated embodiment) disposed at an inner periphery thereof and projecting centrally. The ring-shaped can body contact terminal 89 is electrically conductive and includes a plurality of convex portions 89a (three in the illustrated example) provided elastically deformablly at equal intervals.

Designated by reference numeral 87d is a ring of the electric double layer capacitor 87. Reference numeral 87e denotes a pole projection of the electric double layer capacitor 87–87f designates a can body of the electric double layer capacitor 87. Each projection 88a of the ring-shaped pole projection contact terminal 88 is tapered such that an inner diameter becomes smaller as the contact terminal 88 is rotated in a counterclockwise direction as shown by a white-out arrow. Inner edges of these tapered projections 88a are engaged with peripheral portions of the pole projections 87e such that the pole projection 87e and the contact terminal 88 are coupled together.

Now, assembling methods of the electric double layer capacitor apparatus 85 of FIG. 11A will be described.

First, the contacting copper foil lands 86e formed in the back surface of the board body 86a are brought into contact with the convex portions 89a of the ring-shaped contact terminal 89 as shown by arrows. Then, the board body 86a and the ring-shaped contact terminal 89 are placed on the ring 87d of the electric double layer capacitor 87 as shown by arrows. The sector-shaped projections 87b of the insulator ring 87a are fit into the sector-shaped cuttings 86c of the board body 86a. After fitting the ring-shaped pole projection contact terminal 88 into the pole projection 87e of the electric double layer capacitor 87, the ring-shaped pole projection contact terminal 88 is rotated in a counterclockwise direction, as arrowed, so that the projections 88a are fit into the sector-shaped fitting cutouts 87c of the sector-shaped projection 87b to be secured as shown in FIG. 11B. Inner edge portions of the projection 88a and the pole projection 87e are coupled together.

The can body 87f of the electric double layer capacitor 87 is electrically connected to the control circuit board 86 via the ring 87d and the can body contact terminal 89. The pole projection 87e of the electric double layer capacitor 87 is electrically connected to the control circuit board 86 via the pole projection contact terminal 88.

Thus, in the electric double layer capacitor apparatus 85 according to the seventh embodiment, the control circuit board 86 is made to be floated by the ring-shaped contact terminal 89. The control circuit board 86 is electrically connected to the electric double layer capacitor 87 via the ring-shaped contact terminals 88, 89. Therefore, even when vibrations are applied to the electric double layer capacitor apparatus 85, an electrically connected state of the control circuit board 86 to the electric double layer capacitor 87 can be maintained, and the reliability of the electrical connection between the electric double layer capacitor 87 and the control circuit board 86 is improved.

In the electric double layer capacitor apparatus 10 of the first embodiment, upon mounting the control circuit board 20 onto the cover 33, a mounting space S spanning from the upper surface of the control circuit board 20 to the upper end of the pole projection 34 may be covered by a resin material for protecting the control circuit board 20.

Obviously, various minor changes and modification of the present invention are possible in the light of the above teaching. It is therefore to be understood that within the scope of the appended claims, the invention may be practiced otherwise than as specifically described.

What is claimed is:

1. An electric double layer capacitor apparatus comprising:

an electric double layer capacitor including a metallic sheath can with a bottom, an electrode wrapper housed in said sheath can, a cover for covering an upper aperture of said sheath can and a pole projection projecting upwardly from a center portion of said cover, said pole projection serving as a positive electrode, said sheath can serving as a negative electrode; and a control circuit board having a diameter smaller than that of said sheath can and a control circuit for controlling balance of charge voltage of said electric double layer capacitor, said control circuit board being mounted to said cover such that it does not project beyond an upper end of said pole projection.

2. An electric double layer capacitor apparatus according to claim 1, further comprising an insulator ring made of a resin material, for electrically isolating said pole projection from said sheath can, said insulator ring having a plurality of locking projections projecting upwardly therefrom, said locking projections being engaged in holes formed in said control circuit board to thereby fixedly secure said control circuit board to said electric double layer capacitor.

3. An electric double layer capacitor apparatus according to claim 1, wherein said control circuit board includes a board body having a fitting hole formed centrally thereof, a plurality of sector-shaped cutouts provided around said fitting hole and a plurality of holes provided symmetrically about said fitting hole, and said cover includes an insulator ring forming part thereof and having sector-shaped projections being complementary in shape to said sector-shaped cutouts for fitting into said sector-shaped cutouts, and:fitting projections projecting upwardly through said holes.

4. An electric double layer capacitor apparatus according to claim 1, wherein said control circuit board includes a board body having a fitting hole formed centrally thereof and a plurality of sector-shaped cutouts provided around said fitting hole, said cover includes an insulator ring forming part thereof and having sector-shaped projections being complementary In shape to said sector-shaped cutouts for fitting into said sector-shaped cutouts, each of said sector-shaped projections having a board-fitting cutouts, and said control circuit board is fixedly secured to said electric double layer capacitor by, after fitting said sector-shaped projections into said sector-shaped cutouts, rotating said control circuit board to cause said board body to be fitted into said board-fitting cutouts.

5. An electric double layer capacitor apparatus according to claim 1, wherein said control circuit board includes a board body having a fitting hole formed centrally thereof, a plurality of sector-shaped cutouts provided around said fitting hole, a plurality of copper foil lands provided in a back surface of said board body, and a plurality of through-holes extending through said board body and copper foil lands, said cover includes an insulator ring forming part thereof and having sector-shaped projections being complementary in shape to said sector-shaped cutouts for fitting into said sector-shaped cutouts, and said control circuit board is fixedly secured to said electric double layer capacitor by solder bonding, through said through-holes, copper foil lands to an outer ring made of metal forming part of said cover.

6. An electric double layer capacitor apparatus according to claim 1, wherein said control circuit board includes a board body having a fitting hole formed centrally thereof, said pole projection has a male thread formed on an outer surface thereof, and said control circuit board is fixedly secured to said electric double layer capacitor by screwing, via said fitting hole, said control circuit board into said pole projection.

7. An electric double layer capacitor apparatus according to claim 1, further comprising:

a ring-shaped pole projection contact terminal provided on said control circuit board for electrically connecting said control circuit board and said pole projection of said electric double layer capacitor; and a ring-shaped can body contact terminal provided between said control circuit board and said metallic outer ring forming part of said cover and electrically connecting said sheath can of said electric double layer capacitor and said control circuit board.

8. An electric double layer capacitor apparatus according to claim 7, wherein said ring-shaped can body contact terminal includes a plurality of elastically deformable convex portions provided at predetermined intervals such that they project upwardly.

9. An electric double layer capacitor apparatus according to claim 8, wherein said control circuit board has on a back surface thereof copper foil lands for contacting said elastically deformable convex portions.

* * * * *